(12) United States Patent
Tzschoppe et al.

(10) Patent No.: US 8,238,024 B2
(45) Date of Patent: Aug. 7, 2012

(54) ARRANGEMENT FOR TWO-OR THREE-DIMENSIONAL DISPLAY

(75) Inventors: Wolfgang Tzschoppe, Rothenstein (DE); Thomas Brueggert, Jena (DE); Markus Klippstein, Jena (DE); Ingo Relke, Jena (DE); Uwe Hofmann, Jena (DE)

(73) Assignee: Phoenix 3D, Inc., Merrick, NY (US)

( * ) Notice: Subject to any disclaimer, the term of this patent is extended or adjusted under 35 U.S.C. 154(b) by 0 days.

(21) Appl. No.: 10/532,951

(22) PCT Filed: Sep. 2, 2004

(86) PCT No.: PCT/EP2004/009761
§ 371 (c)(1),
(2), (4) Date: Apr. 27, 2005

(87) PCT Pub. No.: WO2005/053320
PCT Pub. Date: Jun. 9, 2005

(65) Prior Publication Data
US 2006/0192908 A1 Aug. 31, 2006

(30) Foreign Application Priority Data
Nov. 11, 2003 (DE) .................................. 103 53 417

(51) Int. Cl.
*G02B 27/22* (2006.01)
(52) U.S. Cl. ........................................ 359/464; 359/462
(58) Field of Classification Search .................. 359/462, 359/464; 349/74; 348/52, 59; 362/243
See application file for complete search history.

(56) References Cited

U.S. PATENT DOCUMENTS

| 5,134,345 | A | | 7/1992 | El-Hamamsy | |
|---|---|---|---|---|---|
| 5,457,574 | A | | 10/1995 | Eichenlaub | |
| 5,500,765 | A | | 3/1996 | Eichenlaub | |
| 5,606,455 | A | | 2/1997 | Eichenlaub | |
| 5,831,765 | A | * | 11/1998 | Nakayama et al. | 359/464 |
| 5,897,184 | A | | 4/1999 | Eichenlaub | |
| 6,055,013 | A | | 4/2000 | Woodgate et al. | |
| 6,061,179 | A | * | 5/2000 | Inoguchi et al. | 359/464 |
| 6,157,424 | A | * | 12/2000 | Eichenlaub | 349/74 |
| 6,337,721 | B1 | | 1/2002 | Hamagishi | |
| 6,527,410 | B2 | * | 3/2003 | Yamaguchi | 362/243 |
| 2003/0011884 | A1 | | 1/2003 | Van Berkel | |

FOREIGN PATENT DOCUMENTS

| DE | 10053868 C2 | 10/2002 |
|---|---|---|
| JP | 10-268805 | 10/1998 |
| WO | 99/44091 A1 | 9/1999 |
| WO | 01/56265 A2 | 8/2001 |
| WO | 02/35277 A1 | 5/2002 |

* cited by examiner

*Primary Examiner* — Audrey Y Chang
(74) *Attorney, Agent, or Firm* — 24IP Law Group

(57) ABSTRACT

An arrangement for the display of images with selectable three-dimensionally visible or two-dimensional modes, including an illuminating device a filter array to impart a structure to the light a diffusing layer, and a transmissive image display device, with a variable distance a between the filter array and the diffusing layer, so that
in a first position, the structure imparted by the filter array is essentially cancelled due to the light diffusion effect of the diffusing layer, and a two-dimensional image is shown, and
the structure imparted by the filter array is essentially not cancelled, so that the image display device shows a three-dimensional image.

16 Claims, 17 Drawing Sheets

ARRANGEMENT FOR TWO- OR THREE-DIMENSIONAL DISPLAY

FIELD OF THE INVENTION

The invention relates to an arrangement for the display of images with selectable three-dimensionally visible or two-dimensional modes. It relates to autostereoscopic screens that optionally display a two-dimensional image of the usual quality.

BACKGROUND OF THE INVENTION

In the course of research in the field of autostereoscopic display, a great number of methods and arrangements have been developed, which give impressions of space to one or several viewers. These arrangements, however, frequently allow but a limited presentation of common text or two-dimensional graphs, which is the case, e.g., with U.S. Pat. No. 5,457,574 and U.S. Pat. No. 5,606,455. For users it is of advantage, though, if they can switch between 3D display not requiring special eyeglasses and high-resolution, least-impaired 2D display on one and the same device.

Means used for the optical display of the perspective views of an object in autostereoscopic presentation include, among others, electronically controlled color LCD panels, which, when controlled in the conventional way, are suitable also for two-dimensional image display. In many applications there is a keen interest to have a facility for switching from the spatial, autostereoscopic display (hereinafter also called three-dimensional display because of the strong impression of space it conveys) into a two-dimensional display. This is relevant especially for the readability of text, as the image quality is higher in the two-dimensional mode, due to the higher resolution of the image.

A number of arrangements are known that allow such switching over from 2D to 3D and vice versa. In WO 01/56265, for example, a method for spatial display is described in which at least one wavelength filter array provides 3D display. In a special embodiment of this invention, an LCD panel acts as a wavelength filter array with variable transmittance. This provides switching between 2D and 3D display. As a disadvantage, though, the light has to penetrate two LCD panels, i.e. through a great number of devices as, e.g., polarizing filters, liquid crystal layers and other component parts such as carrier substrates, so that brightness is reduced in both 2D and 3D display.

In U.S. Pat. No. 6,157,424, a 2D/3D display is described in which two LCD panels are arranged one behind the other, one of which is used as a barrier that can be switched on in addition.

WO 02/35277 describes a 3D display provided with a substrate that contains stripes having a first set of optical properties and, in between them, stripes having a second set of optical properties, and a polarizer. Among other things, this permits switching between 2D and 3D by means of rotating the polarization, or adding or removing a polarizer.

Another display switchable between 2D and 3D is known from U.S. Pat. No. 6,337,721. This device is provided with several light sources, a lenticular, and at least one functionally essential, switchable diffusion disk. These components provide various illumination modes for obtaining a 2D or 3D display.

Known from U.S. Pat. No. 5,897,184 is an autostereoscopic display with a reduced-thickness illumination module for portable computer systems, which allows switching from 3D to 2D and vice versa in a zone-by-zone mode. The downside is that it is a two-channel 3D display for a single viewer, who has to occupy a fixed viewing position at that. Moreover, the brightness of the image in the 3D mode is lower than that of comparable two-channel 3D displays. This refers to such 3D displays that present exactly one left and one right image. Furthermore, a viewer who is not in the correct viewing position depthwise in front of the 3D display will see disturbingly strong moiré effects. In the 2D mode, the light available for the 3D mode is dispersed, among other means, with the aim to undo the 3D image separation by homogenizing the illumination. In arrangements with switchable diffusion disk, this results in a reduction of image brightness in the 2D mode, because the dispersive state of such diffusion disks has a transmittance of less than 1 (for example, approximately. 50%). Besides, manufacturing the device takes much effort and cost. As a further disadvantage, the insertion of a switchable diffusion disk increases the distance between the illuminating module and the image-reproducing panel, which inhibits normal viewing distances especially in 3D displays with small pixels and/or high resolution.

U.S. Pat. No. 5,134,345 describes an illuminating system for high-resolution and 3D displays, which, at first, generates certain illuminating patterns in a time-sequence (stroboscopic) mode. Another embodiment is a 2D/3D display provided with a diffusion disk that can be switched between a transparent and a dispersive mode, the latter being used for the 2D mode.

U.S. Pat. No. 5,500,765 describes a way to cancel out the effect of a lenticular by hinging down on it a complementary arrangement of lenses. This virtually switches off the 3D display. This approach works only with lenticular systems and requires the fabrication of an exactly complementary arrangement of lenses. Other drawbacks are sensitivity to dust, and increased reflection losses.

DE 100 53 868 C2 describes an arrangement allowing the choice of 2D or 3D display, which uses two light sources, with the 3D illumination always being switched off, or its light blocked, for the purpose of 2D display. The disadvantage of this arrangement is that the luminance of the 2D illumination cannot be made sufficiently homogeneous. Moreover, if a commercial light guide is used for 2d illumination, its macroscopic structure is visible to the viewer or viewers, as a rule, creating a disturbing pattern, whereas an invisible microscopic structure is difficult and expensive to manufacture.

The purpose of JP 10268805 it to generate a bright 2D image and ensure equal brightness for the 2D and 3D displays. This is attempted by using a lenticular screen as an illumination barrier arranged behind an image display means. In addition, a weakly diffusing disk is arranged there for temporary cancellation of the effect of the lenticular.

The disadvantage of this arrangement is that it requires an inherent light source for light of parallel rays, so that, in strict sense, there is no 3D viewing space but only a single, fixed 3D viewing position. Moreover, parallel radiation requires a complicated light guide in the "side light mode" used in this arrangement. A complicated, expensive "side light" would also be required for adding a "parallelization structure" to the light guide face opposite the outcoupling face, i.e. the one facing the viewer. Because of the optical lenticular screen method, the foci, e.g., in case of oblique parallel illumination would not lie in one plane of the diffuser. With 3D display, this would give rise to varied degrees of image blurring, especially when viewed obliquely.

US 2003/0011884 A1 provides for switching between 3D and 2D with "diffusing means". Compared with a purely 3D display, the 3D/2D display contains additional "converting means", which consist, in "the second condition" (meaning the 2D mode), "diffusing means" intended to provide 2D display in various ways.

The downside of this arrangement is that resolution in the 2D mode is very poor and "full resolution" cannot be reached in that mode. As a result, for example, text presented in the 2D mode is illegible. In the arrangements illustrated in FIG. 9 and FIG. 10 of US 2003/0011884 A1, which feature a switchable diffusing layer 94 inside the lenticular screen 15, the optical distance between the diffusing layer and the subpixels may be smaller, but still is relatively large. In addition, the manufacture of such a lenticular screen is difficult and expensive, and because of the added switchable diffusion properties it has further drawbacks. Further, it does not reach the ambient light compatibility of conventional 2D displays.

A lenticular screen is also preferably used in WO 99/44091. Here, the image-separating lenticular screen is intended to act as a "light diffusing" component when brought into a position close to the image display means. The lenticular screen itself is not made with light diffusing properties, neither on its convex or its plane surface, nor in its interior. The diffusing effect is intended to be brought about by the lenticular grid itself. This means, however, that the diffusion layer has a finite distance from the image display means and a distance of virtually 0 mm from the image separator. Therefore, the diffusing layer must necessarily impair the 2D image on the image display means and cannot cancel the image-separating effect of the lenticular screen. As a result, text presented in the 2D mode with these arrangements remains illegible; furthermore, they do not reach the ambient light compatibility of conventional 2D displays.

SUMMARY OF THE INVENTION

Based on the above, it is the purpose of the present invention to create an arrangement of the kind mentioned at the beginning, that can be implemented by simple means. In the 3D mode, the arrangement is intended to present an image that can be seen in three dimensions by several viewers at a time without the need of extra aids. In the 2D mode, the intention is to present an image with the best possible resolution, preferably with full resolution. Image brightness is intended to be equal in the 2D and 3D mode, preferably without any reduction of image brightness in the 3D mode caused by the 2D/3D switching means in comparison to a pure 3D display. As another purpose, the present invention is intended to implement typical—preferably small—viewing distances, especially with 3D displays of high resolution. The arrangement to be created should preferably have the same ambient light compatibility as a pure 2D display.

According to the invention, the problem is solved by an arrangement allowing a choice between three-dimensionally visible and two-dimensional display, comprising an illuminating device emitting light distributed over an area, at least one filter array arranged before the illuminating device (in viewing direction) and intended to impart a structure to the light originating from the illuminating device, at least one diffusing layer arranged before the filter array (in viewing direction), a transmissive image display device arranged before or behind the diffusing layer (in viewing direction), preferably in the form of a TFT-LCD panel, in which The distance a between the filter array and the diffusing layer is variable, so that in a first position, in which the diffusing layer is arranged at a distance from the filter array, the structure imparted by the filter array to the light originating from the illuminating device is essentially cancelled due to the light diffusion effect of the diffusing layer, preferably below the contrast threshold of human vision, and a two-dimensional image is shown on the image display device in the full resolution provided by it, and in a second position, in which the diffusing layer is arranged in contact with, or at least close to the filter array, the structure imparted by the filter array to the light originating from the illuminating device is essentially not cancelled, so that the image shown on the image display device is seen in three dimensions.

The invention provides for various embodiment versions as follows:

Version 1a: Transmissive image display device arranged behind the diffusing layer (in viewing direction); image display device, diffusing layer and illuminating device are immovable; the filter array is applied on a transparent substrate; for the purpose of varying the distance a, the transparent substrate with the filter array is movable relative to the diffusing layer Version 1b: Transmissive image display device arranged before the diffusing layer (in viewing direction); image display device, diffusing layer and illuminating device are immovable; the diffusing layer may optionally be applied on a transparent substrate; the filter array is applied on a transparent substrate; for the purpose of varying the distance a, the transparent substrate with the filter array is movable relative to the diffusing layer.

Version 2a: Transmissive image display device arranged before the diffusing layer (in viewing direction); the filter array is applied on a transparent substrate; the transparent substrate with the filter array is rigidly connected to the illuminating device (the filter array may also be applied directly on the illuminating device); for the purpose of varying the distance a, the transparent substrate, the filter array and the illuminating device can be jointly moved relative to the diffusing layer and the image display device.

Version 2b: Transmissive image display device arranged before the diffusing layer (in viewing direction); the diffusing layer may optionally be applied on a transparent substrate; the filter array is applied on a transparent substrate; the transparent substrate with the filter array is rigidly connected to the illuminating device (the filter array may also be applied directly on the illuminating device); for the purpose of varying the distance a, the transparent substrate, the filter array and the illuminating device can be jointly moved relative to the diffusing layer and the image display device.

Version 3a: Transmissive image display device arranged before the diffusing layer (in viewing direction); the diffusing layer and the image display device are rigidly connected to each other; the filter array is applied on a transparent substrate; the transparent substrate with the filter array is rigidly connected to the illuminating device; for the purpose of varying the distance a, the image display device and the diffusing layer are movable relative to the filter array and the illuminating device.

Version 3b: Transmissive image display device arranged before the diffusing layer (in viewing direction); the diffusing layer is applied on a transparent substrate; the filter array is arranged on the illuminating device; for the purpose of varying the distance a, the transparent substrate and the diffusing layer are movable relative to the filter array and the illuminating device. Optionally, the image display device is movable jointly with the diffusing layer and the transparent substrate.

Proceeding from the above six versions, further versions can be created by combination. In all versions, however, filter array, illuminating device, image display device and diffusing layer should be aligned essentially in parallel. Further, the movement of each component should preferable take place normal to the large surfaces of the components.

The distance a depends especially on the condition of the diffusing layer, the pixel size of the image display device and the feature size or conspicuousness of the filter structure; in the first position, the distance may, e.g., within a range from 10 mm to 30 mm, or be greater or (preferably) smaller. In the second position, the distance a may, e.g., be 0.2 mm or greater.

It should be noted here that the versions 1a, 2a, and 3a above are particularly preferable, as they offer the advantageous possibility to make the distance z between filter array and image display device equal to zero. The distance z is the distance between the image display device and the filter array, measured from the image display device side facing the filter array.

In this way it is possible to achieve common—and especially small—viewing distances in the 3D mode, i.e. in the second position even with high-resolution image display devices or with such having very small pixel periods.

It is self-evident that the transmissive image display device may be some device other than TFT-LCD panels. Further, the said TFT-LCD panel may be suitable for either color or grey level display. In versions 1a, 2a and 3a, the diffusing layer, which is favorably arranged before and attached to the image display device, preferably consists in an antiglare matte finish layer on the viewer-side polarizing filter, as common with LCD panels. In this case, only this one diffusing layer of the type described is provided. It may, however, be of advantage if there is, in addition to the first one, a second diffusing layer, which then is arranged, e.g., behind the image display device (in viewing direction). In case of image display devices having an antireflection-coated surface only (i.e., without antiglare matte-finish layer), or in case of combinations of anti-reflection-coated and antiglare-coated surfaces, the (here) only diffusing layer may be arranged before or behind the image display device, depending on the embodiment version. Irrespective of the embodiment version, the undifferentiated term "diffusing layer" is used hereinafter.

For the illuminating device, one may use, e.g., a common backlight consisting of CCFL tubes arranged in parallel, or a sidelight consisting of a light guide with CCFL tubes, together with control device and various films (e.g., Brightness Enhancement Film and Dual Brightness Enhancement Film made by 3M).

The filter array may be, for example, an exposed and processed photographic film having preferably transparent and opaque area segments. These area segments are arranged in a defined two-dimensional pattern. Regarding the patterning and fabrication of filter arrays, reference is made, for example, to the applications DE 201 21 318 U1, WO 01/56265, PCT/EP2004/004464, PCT/EP2004/001833 and DE 101 45 133.

Both the filter array and the diffusing layer may be used without a substrate; for that purpose they can, e.g., be tentered on a frame so as to have a plane surface.

Depending on the distance z required between filter array or illuminating device and image display device, the field of view may be vignetted. This means that a viewer looking obliquely at the screen margin/margins looks past the filter array or the illuminating device, so that the 2D image shown (and possibly also the 3D image) is not sufficiently illuminated over its full size.

This can be remedied by arranging a mirror well around the filter array that provides a virtual homogeneous enlargement of the filter array or the luminous surface of the illuminating device, preferably in embodiment version 1a. Depending on the position of the arrangement according to the invention, the mirror well reflects either the light of the illuminating device or the part thereof that penetrates the filter array, so that the vignetting disappears.

The mirror well is implemented, for example, by way of first-surface mirrors of high reflectance (e.g., $\rho > 98\%$, 3M "Enhanced Specular Reflector" film, laminated onto a plane carrier substrate), arranged normal (90°) to the surface of the filter array and surrounding it. The slots required for mechanical components to effect the respective movement provided in the versions described above should be as small as possible. The mirror surface should be scratch-proof.

Another version that avoids the said vignetting uses an illuminating device the surface of which is enlarged—preferably in all directions—relative to the image display device, and a correspondingly enlarged filter array. This has the effect that a viewer looking obliquely at the margin of the image surface of the image display device also looks at the filter array or the luminous surface of the illuminating device without any vignetting.

Compared to this last-mentioned version, antivignetting by means of a mirror well has the advantage that the virtual enlargement of the illuminating device and possibly the filter array is quasi-infinite, so that vignetting is avoided for oblique viewing at any angle, including large angles.

Further it is of advantage to display information in the negative mode. This means that, preferably, white objects, e.g., Microsoft WORD texts, are shown on a blue background. The results are much better contrast of low-contrast objects, improved readability, reduced flicker, and a smaller distance a between filter array and diffusing layer for the first position (2D mode).

For further optimization, a weakly diffusing film may be laminated to the inside of the image display device. This minimizes the requirements for the diffusing power of the diffusing layer (e.g., the antiglare matte-finish layer of the image display device) and/or for the size of distance a in the first position of the arrangement according to the invention.

In addition it is possible to provide the image display device, e.g., a color LCD panel, with a more strongly diffusing antiglare matte finish as a diffusing layer, in order to minimize the travel $\Delta a$ of the respective components between the first and second positions. For this purpose, the area below the luminance/diffusion indicatrix of the antiglare matte finish is enlarged in that especially near-angle diffusion is improved and/or, for example, the half-power angle of the indicatrix is increased. To minimize the travel still further, the pixel pitch/the pixel size on the image display device can be decreased. Therefore, the size or period of the structures on the filter array is also decreased and, thus less well resolvable by the human eye, which is desirable for both the first (2D mode) and second (3D mode) positions.

Furthermore, means for controlling the image display device can be provided, so that it can simultaneously show, in a defined assignment, bits of partial information from several views of a scene or object, in such a way that a smallest physical picture element of the image display device either shows partial information from one view or a mix of bits of partial information from at least two views; see also DE 101 45 133 C2. Naturally, it is also possible that the said means for controlling the image display device with partial information from several views operate by other image combination rules, e.g., those described in DE 101 18 461 or other documents mentioned hereinbefore.

With the TFT-LC displays known in prior art, which are intended for outdoor applications and for use in direct sunlight, the polarizing foil is provided with an antireflection coating instead of the antiglare matte finish. These very bright TFT-LCD panels thus lack the antiglare matte finish. When used in arrangements according to the invention, such LCD panels would be provided with the aforesaid diffusing layer as an added component.

The diffusing layer employed—if it is a separate layer rather than an antiglare matte finish—is favorably designed to be permanently (light-)diffusing. Preferably, it has a high light transmittance, which should at least be greater than 50%. It may be made as an optically diffusing layer on a transparent substrate, hereinafter referred to as diffusion disk. In practical configurations, the diffusing layer may, for example, be a diffusing film for LCD panel backlights or sidelights (e.g., as made by 3M) or greaseproof paper, each laminated onto a glass substrate, or the ground and/or etched surface of a glass substrate. The diffusing layer and the substrate should be as thin as possible.

Alternatively, in another version of the arrangement according to the invention, the diffusing layer may be made controllable so that it has a diffusing effect in a first mode (in the first position of the arrangement) and acts as a transparent medium in a second mode (in the second position of the arrangement). Such electrically switchable diffusing layers are known in prior art and available, for example, from INNOPTEC (Rovereto, Italy) as PDLC film.

In the aforesaid version 3b, the substrate with the diffusing layer is used as the preferred spacer that keeps the image display device (here: a TFT-LCD panel) at a desired distance z from the filter array in the 3D mode, i.e. in the second position.

In the other versions (1a, 2a and 3a), this distance z (preferably configured as an air gap, i.e. with no additional optically effective components needed) between filter array and image display device in the second position of the arrangement is, as a rule, between (including) 0 mm and 20 mm, although other values are within the scope of the invention as well. The said distance z especially depends on the pixel pitch of the image display device and on the optimum viewing distance for 3D display.

The movable components of the arrangement according to the invention (e.g., filter array and/or diffusing layer and/or image display device and/or illuminating device—depending on the version) may further be provided with laterally fixed struts by means of which the components are moved. The struts form a mechanical bridge between the respective component and a drive unit.

The drive unit effecting the movement may be, for example, at least one stepper motor and/or at least one piezoelectric element and/or at least one solenoid and/or a pump. Generally, any of various electromagnetic devices may be used that provide translation.

In an embodiment according to version 1b, a pump, for example, may influence the air pressure between the filter array and the image display device in such a way that the diffusing layer accordingly moves to the first or second position as desired.

If the diffusing layer is a separate component rather than an antiglare matte finish layer, it may be flexible and not have a transparent substrate so as to form, e.g., a diffusing film, and its position would then be varied by the air pressure; i.e. it is, in a way, sucked or pressed against the filter array. The flexible diffusing layer may also be positioned in a pneumodynamic mode in which forces resulting from an air stream act on the diffusing layer. It is also possible to use hydraulic positioning arrangements. Alternatively, any of these positioning movements may act on the filter array.

In another embodiment, the movement of one or several components of the arrangement is effected by manual action of the user, with easy manipulation being enabled by means of small wheels, or by wings with eccentric cams, provided laterally on the arrangement according to the invention, the said wheels or wings being mechanically connected with the component and causing it to move. The driving force for moving the component (possibly together with further components such as, e.g., the transparent substrate) is, in this case, exerted by the user.

Moreover, it is also within the scope of the invention that the diffusing layer is segmented into area segments and that selectable segments of the diffusing layer can be independently positioned to the first and second positions, respectively. This enables part of the area to be switched from two-dimensional to three-dimensional display and vice versa, so as to allow simultaneous 2D and 3D display.

Naturally, each version of the arrangement according to the invention is provided with a suitable enclosure.

Further, the illuminating device emitting light that is distributed over an area, and the filter array arranged in front of it may be replaced by a light source emitting light that is structured in agreement with the filter array structure. As a rule, such a light source has a great number of small luminous surfaces arranged between black or opaque area segments in a defined two-dimensional structure. Also, the arrangement according to the invention may additionally employ further operating principles for 2D/3D switching of autostereoscopic screens, as described in WO 2004/057878.

BRIEF DESCRIPTION OF THE DRAWINGS

Below, the invention is described in detail with reference to the accompanying drawings, in which.

DETAILED DESCRIPTION OF THE INVENTION

Figure 1:
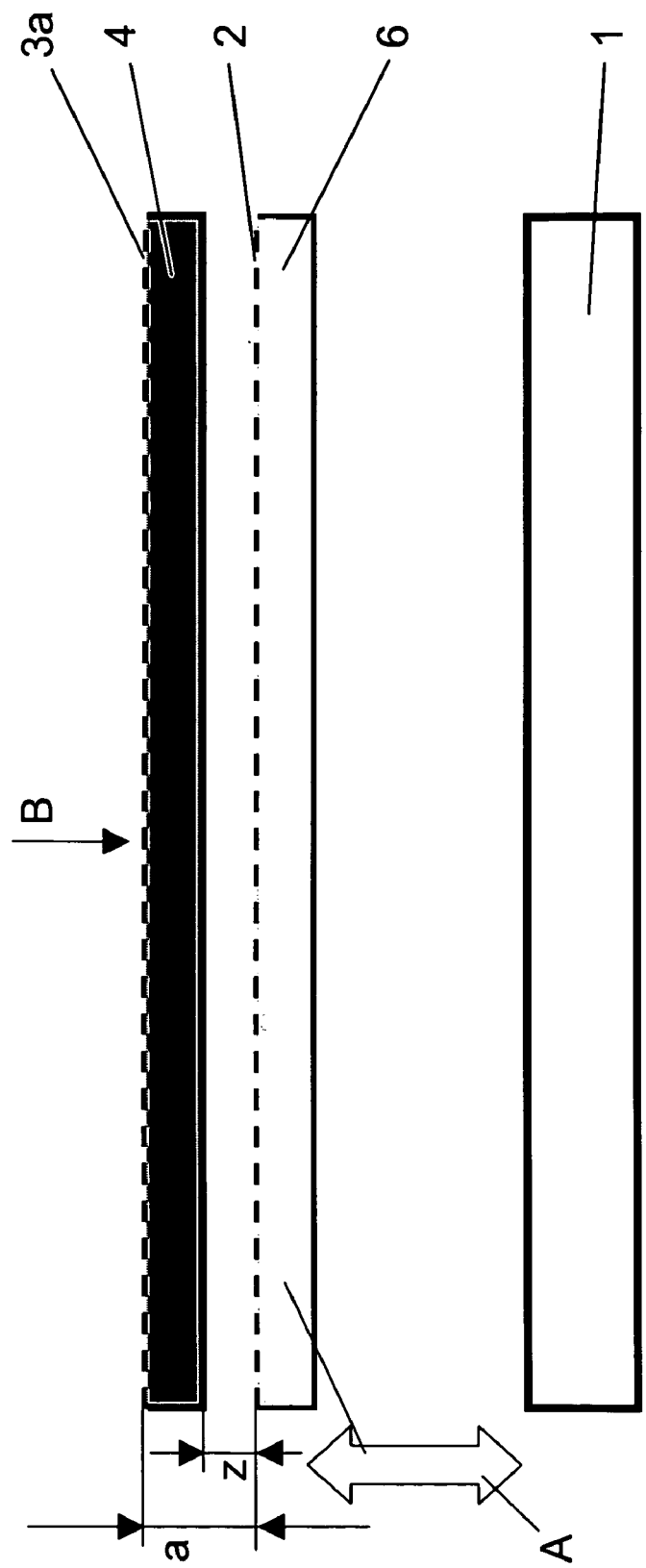
FIG. 1 is a sketch illustrating the principle of the arrangement according to the invention in a first, preferred embodiment version.

FIG. 1 is a sketch illustrating the principle of a first embodiment version of the arrangement according to the invention. As shown in FIG. 1, the arrangement comprises an illuminating device 1 emitting light distributed over an area, a filter array 2 arranged before the illuminating device 1 ((in viewing direction B)) and intended to impart a structure to the light originating from the illuminating device 1, a diffusing layer 3a arranged before the filter array 2 and the image display device 4 ((in viewing direction B)), and, as an example, a transmissive image display device 4 arranged behind the diffusing layer 3a ((in viewing direction B)).

The diffusing layer 3a at the image display device is preferably a common antiglare matte finish as it is typical of LCD panels. The image display device 4 is rigidly connected with the illuminating device 1 through subassemblies not shown on the drawing. The filter array 2 is, for example, laminated onto a transparent substrate 6.

In order that the distance a between the filter array 2 and the diffusing layer 3a can be varied according to the invention, only the transparent substrate 6, jointly with the filter array 2, is arranged so as to be movable relative to the other components, as indicated by arrow A. This corresponds the particularly preferred embodiment according to version 1a mentioned hereinbefore. It can be implemented by very simple means.

Figure 2:
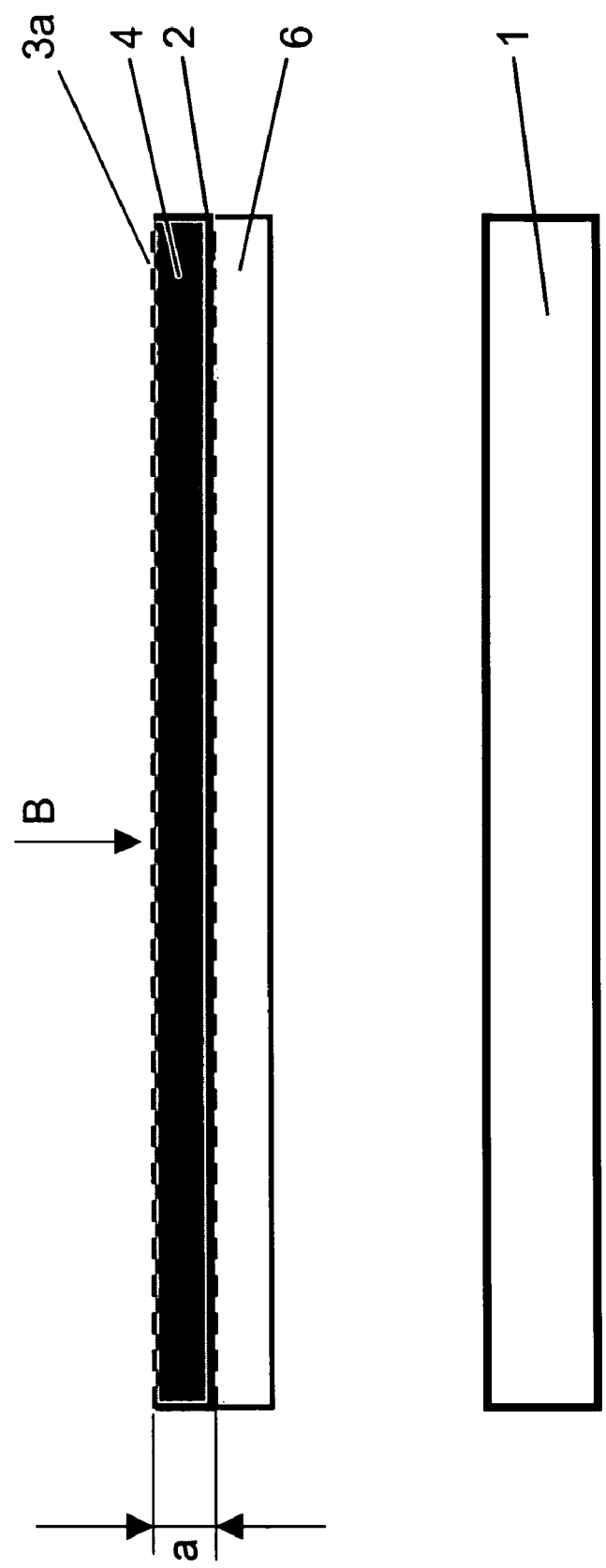
FIG. 2 is a sketch illustrating the principle of the embodiment version according to FIG. 1 in a second position.
Figure 3:
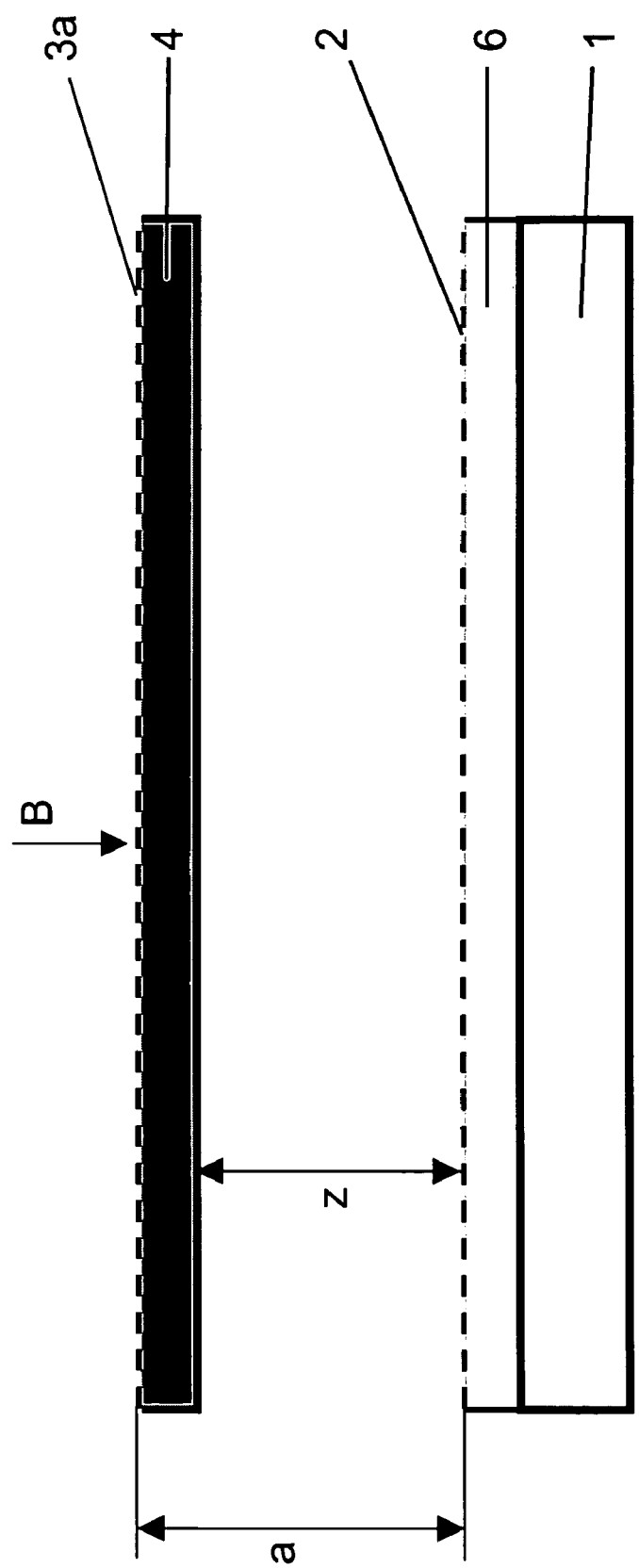
FIG. 3 is a sketch illustrating the principle of the embodiment version according to FIG. 1 in a first position.

By displacing the transparent substrate 6 jointly with the filter array 2 from a first position shown in FIG. 3 to a second position shown in FIG. 2, the arrangement is switched from a 2D display mode (FIG. 3) into a 3D display mode (FIG. 2).

In this way, in the first position (FIG. 3), the structure imparted by the filter array 2 to the light originating from the illuminating device 1 is essentially cancelled due to the light diffusion effect of the diffusing layer 3a, and a fully resolved two-dimensional image is shown on the image display device 4 and can be seen by a viewer (not shown on the drawing) from viewing direction B, among others. This image may be, for example, a perspective view of a scene or object, or some text.

FIG. 2 shows the arrangement according to version 1a, with the diffusing layer 3a being in a second position here. The diffusing layer 3a is now positioned close to the filter array 2, i.e. the distance a between the diffusing layer 3a and the filter array 2 is equal to the thickness of the image display device 4, e.g., a=1.0 mm, so that the structure imparted by the filter array 2 to the light originating from the illuminating device 1 is essentially not cancelled, so that an image shown on the image display device 4, which, for example, is composed of several perspective views of a scene or object, is seen in three dimensions by the viewer from viewing direction B.

Such a 3D image may, for example, be an image composed of eight or more views of a scene or object, as known in prior art.

Figure 4:
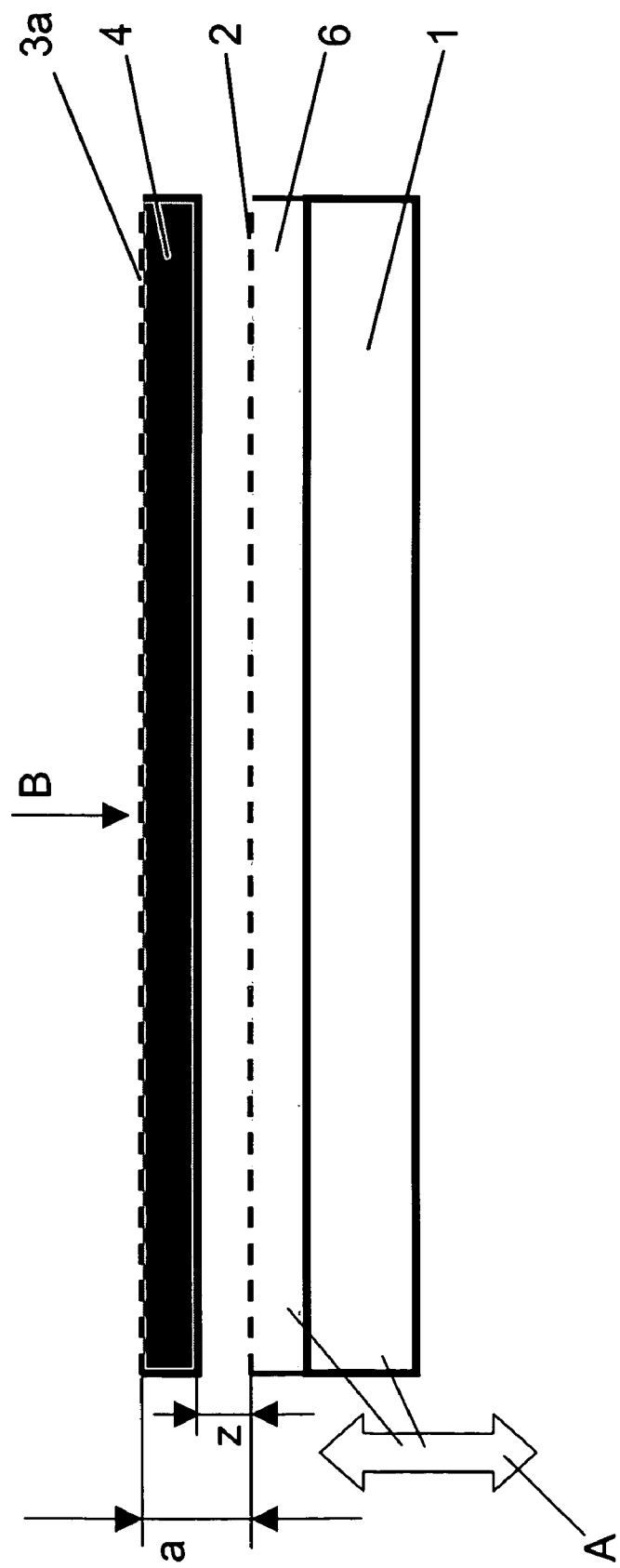
FIG. 4 is a sketch illustrating the principle of the arrangement according to the invention in a second embodiment version.

In a second embodiment version of the arrangement according to the invention, which is shown in FIG. 4, there are again provided (in the order of the viewing direction) a diffusing layer 3a, an image display device 4, a filter array 2 applied on a transparent substrate 6, and an illuminating device 1.

Unlike the first embodiment version, here the transparent substrate 6 and the filter array 2 are rigidly connected to the illuminating device 1, whereas the transparent substrate 6, the filter array 2 and the illuminating device 1 are arranged to be jointly movable for the purpose of varying the distance a, as again indicated by the arrow A. This corresponds to an embodiment according to version 2a. Here again, the movement can be implemented by very simple means.

Figure 5:
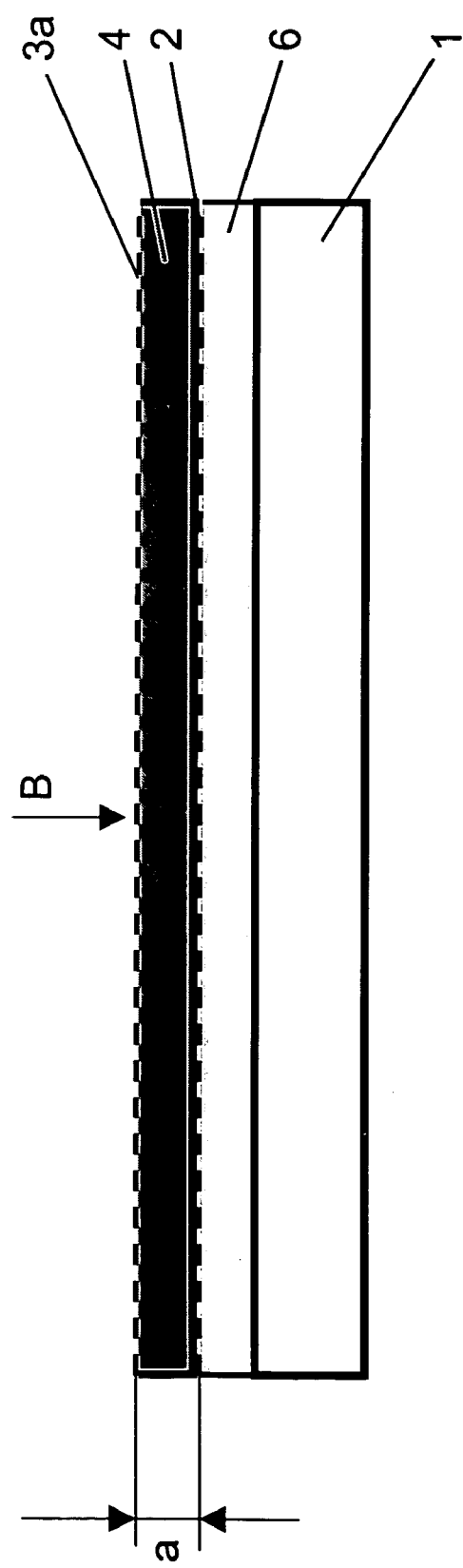
FIG. 5 is a sketch illustrating the principle of the embodiment version according to FIG. 4 in the second position.
Figure 6:
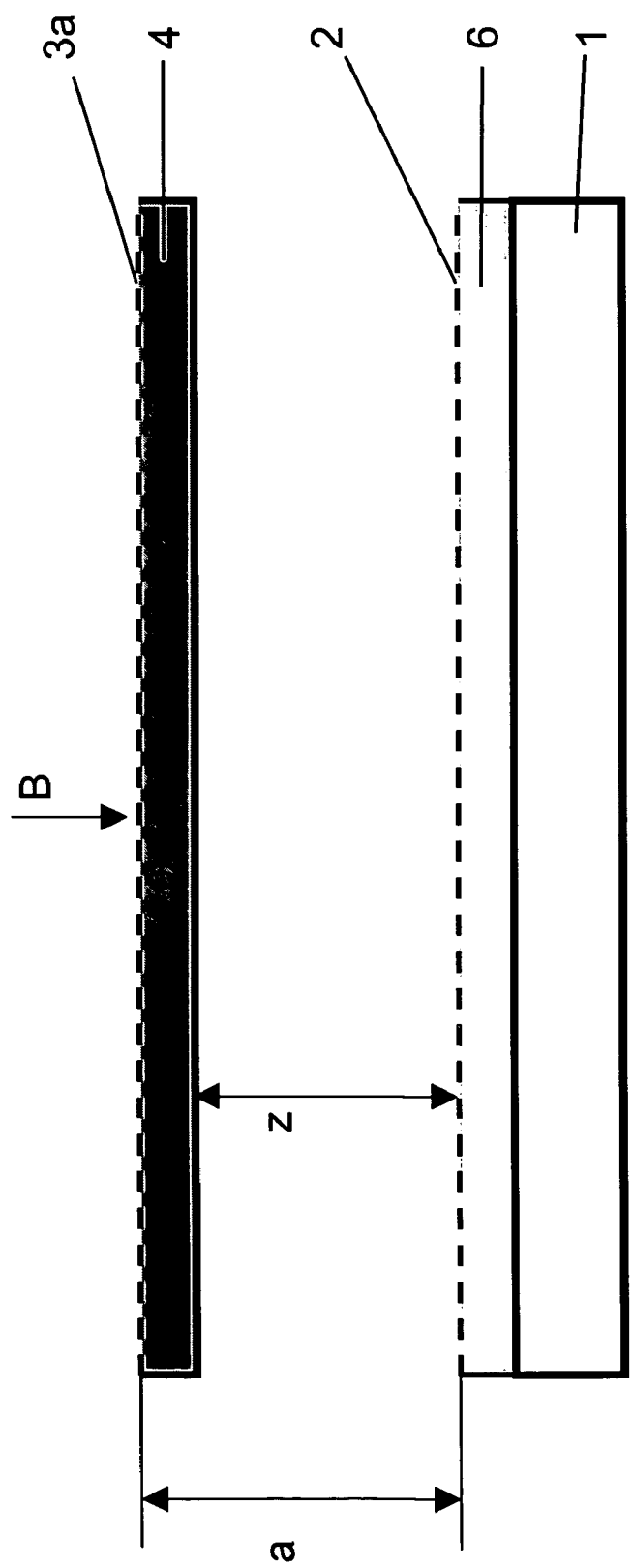
FIG. 6 is a sketch illustrating the principle of the embodiment version according to FIG. 4 in the first position.

By varying the distance a it is possible to set a 3D display mode (second position of the arrangement) as shown in FIG. 5, and a 2D display mode (first position of the arrangement) as shown in FIG. 6.

The principle of how the 2D and 3D modes are achieved is analogous to that described in connection with FIG. 2 and FIG. 3 and therefore need not be repeated here.

Figure 7:
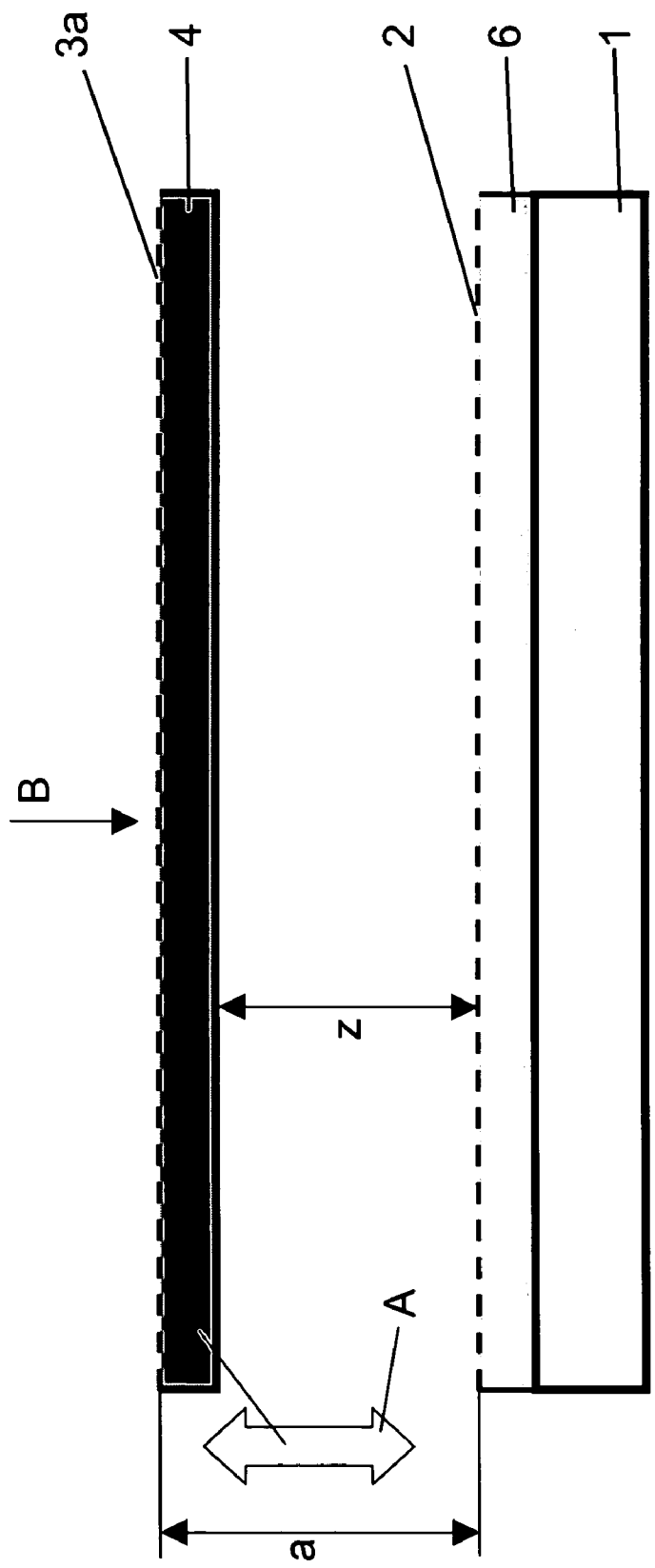
FIG. 7 is a sketch illustrating the principle of the arrangement according to the invention in a third embodiment version.

Let a third embodiment version be explained with reference to FIG. 7. Here, the order in which the components are arranged corresponds to that in the embodiment versions already described, with the difference, however, that the image display device 4 and the diffusing layer 3a are arranged to be jointly movable for the purpose of varying the distance a, whereas a subassembly consisting of filter array 2, transparent substrate 6 and illuminating device 1 is relatively at rest or is attached in a fixed position relative to the chassis. This corresponds to the embodiment according to version 3a.

Figure 8:
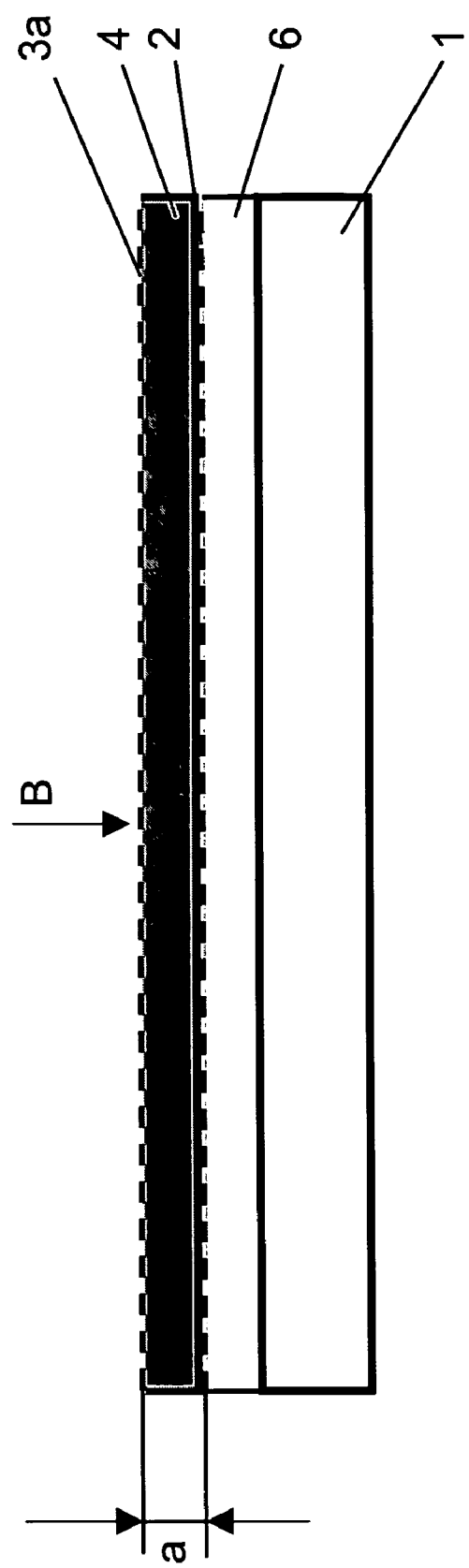
FIG. 8 is a sketch illustrating the principle of the embodiment version according to FIG. 7 in the second position.
Figure 9:
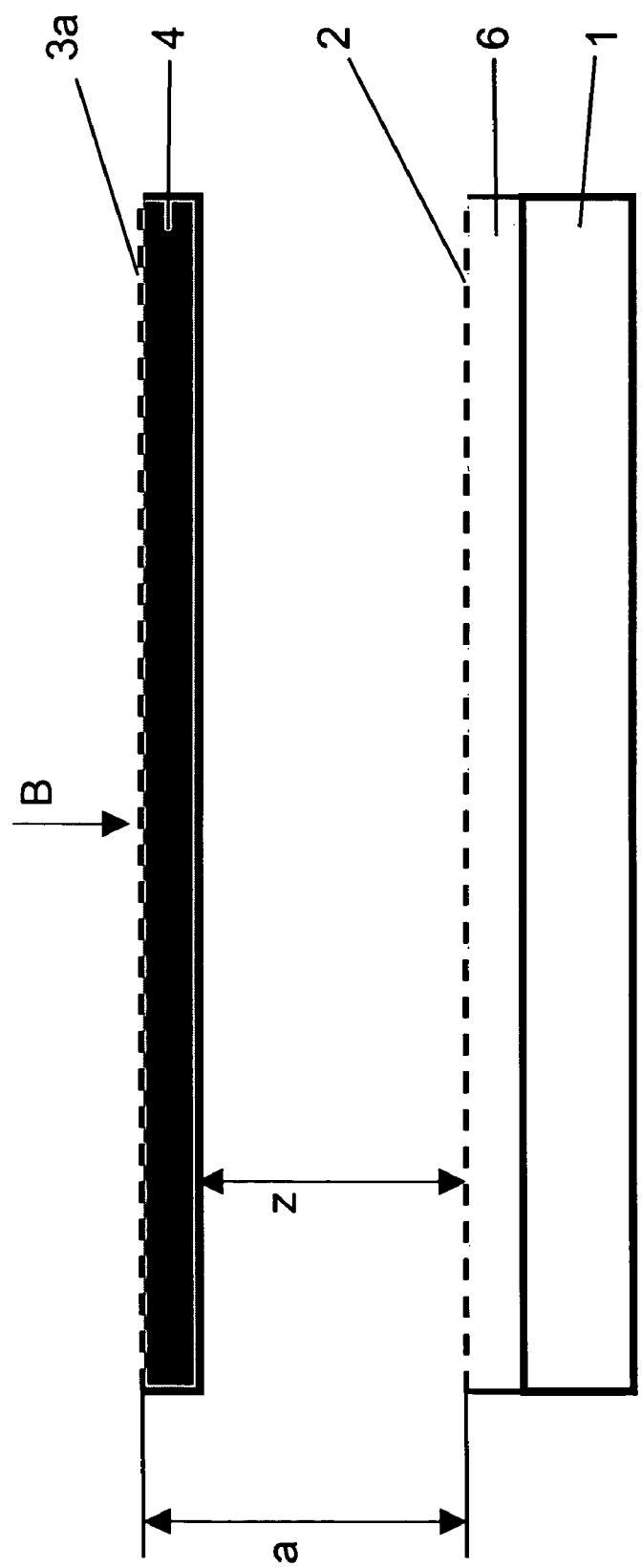
FIG. 9 is a sketch illustrating the principle of the embodiment version according to FIG. 7 in the first position.

Analogously to the embodiment versions already described, the distance a shown in FIG. 8 illustrates a 3D viewing mode, and that shown in FIG. 9 illustrates a 2D viewing mode.

Figure 10:
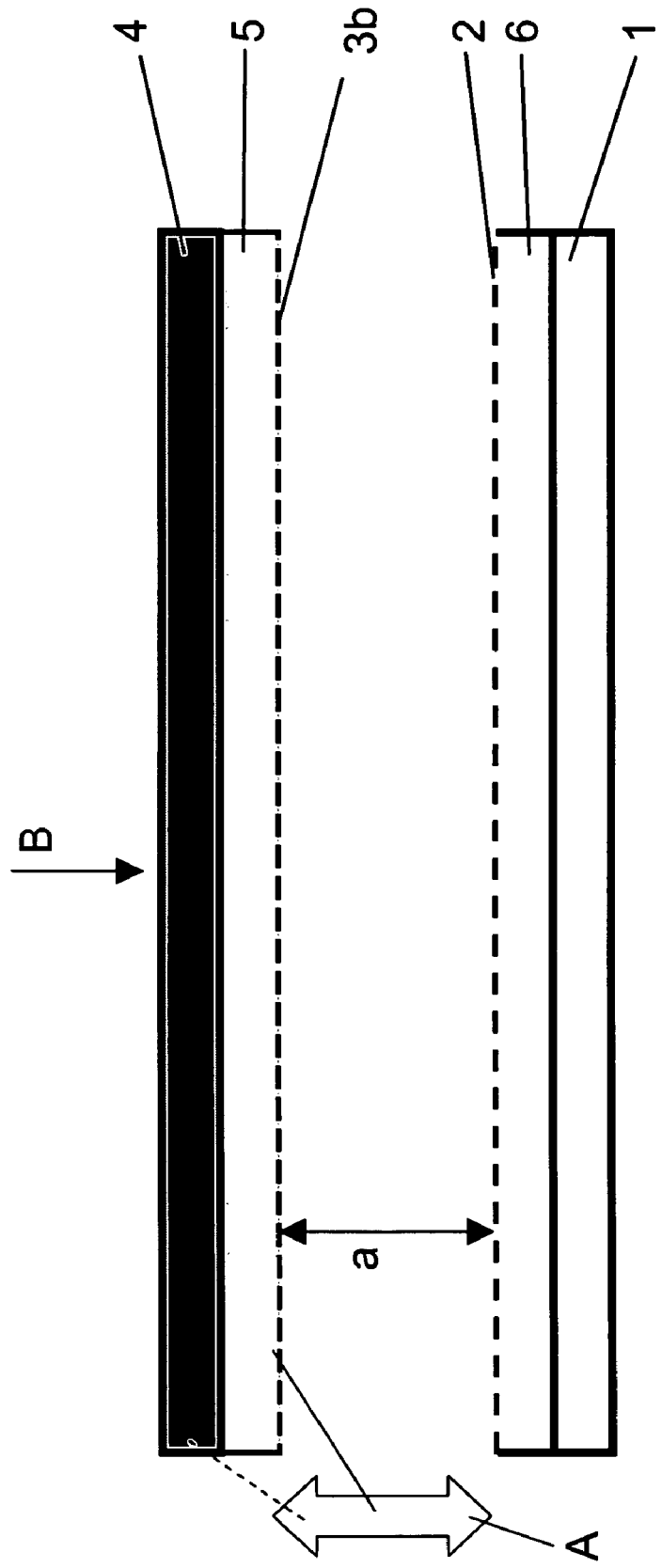
FIG. 10 is a sketch illustrating the principle of the arrangement according to the invention in a fourth embodiment version.

FIG. 10 shows a fourth embodiment version of the arrangement according to the invention. Here, a transmissive image display device 4 is arranged before the diffusing layer 3b (in viewing direction B), and it is preferably designed as a TFT-LCD panel. Here again, the distance a between the filter array 2 and the diffusing layer 3b is variable, as indicated by the arrow A drawn at the diffusing layer 3b. This corresponds to the version 3b mentioned before, with the understanding that the image display device 4 is not necessarily moved. The broken line indicates that the image display device 4 may take part in the movement, though.

Figure 11:
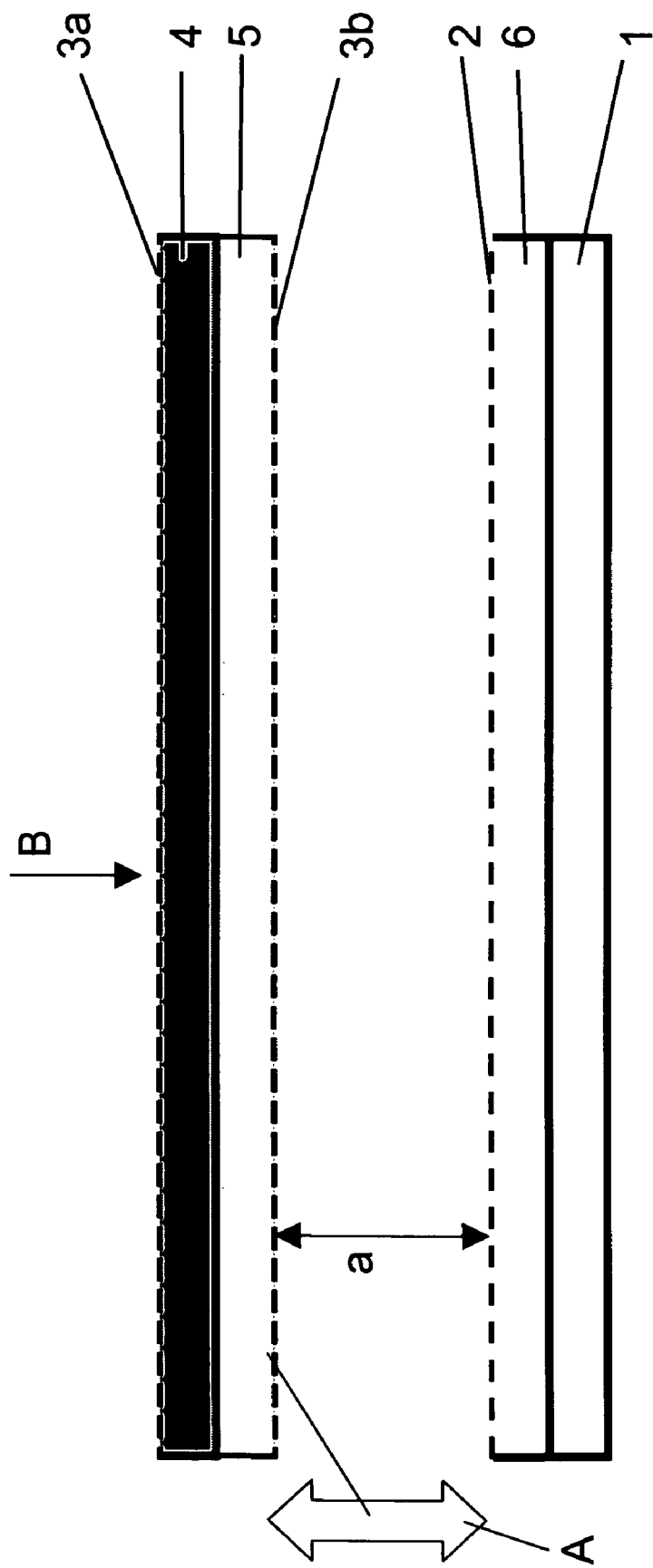
FIG. 11 is a sketch illustrating the principle of the arrangement according to the invention in a fifth embodiment version.

FIG. 11 is a sketch illustrating the principle of the arrangement according to the invention in a modification of the fifth embodiment version. Here, two diffusing layers 3a and 3b are provided. The diffusing layer 3a (as in the first to third embodiment versions) preferably is a common antiglare matte finish on a TFT-LCD panel (which corresponds to the image display device 4). Diffusing layer 3b, though, is a separately added one, as in the embodiment according to FIG. 10. Here, switching between the first and second positions varies the distances a1 and a2 between the filter array 2 and the two diffusing layers 3a and 3b in accordance with the principle; the length of travel (displacement) Δa is, of course, identical for both diffusing layers.

Figure 13:
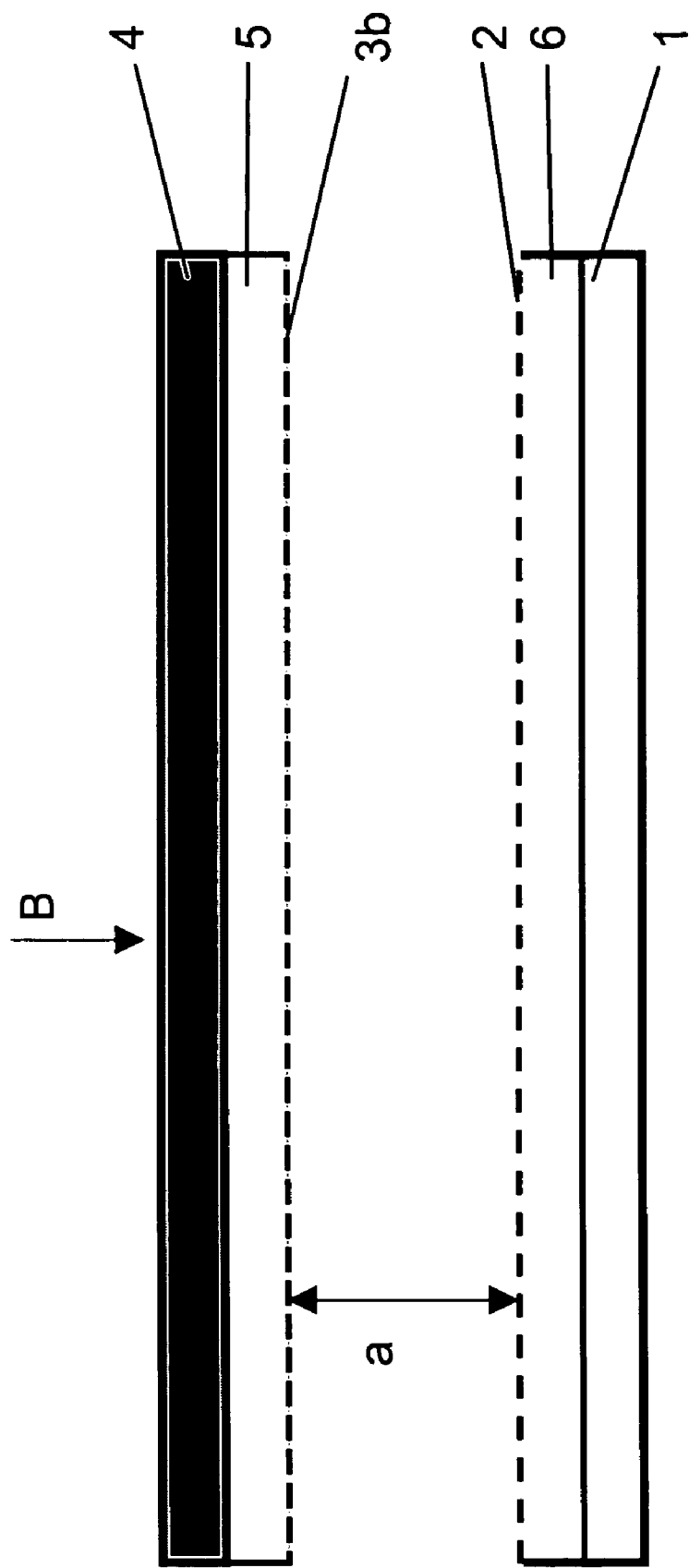
FIG. 13 is a sketch illustrating the principle of the embodiment version according to FIG. 10 in the first position.

FIG. 13 shows another sketch illustrating the principle of the embodiment version according to FIG. 10, in which the diffusing layer 3b is in a first position. The distance a between the diffusing layer 3b and the filter array 2 is a few millimeters, depending on the diffusing power of the diffusing layer 3b; for example, it may be a=3 mm.

Therefore, the structure imparted by the filter array 2 to the light originating from the illuminating device 1 is essentially cancelled due to the light diffusion effect of the diffusing layer 3b, and a fully resolved two-dimensional image is shown on the image display device 4 and can be seen by a viewer (not shown on the drawing) from viewing direction B, among others. This image may, for example, be a perspective view of a scene or object, or some text.

By contrast, FIG. 12 again is a sketch illustrating the principle of the fourth embodiment version according to FIG. 10, in which, however, the diffusing layer 3b is in a second position, namely, in close contact with the filter array 2, i.e. the distance a between the diffusing layer 3b and the filter array 2 is a=0 mm, so that the structure imparted by the filter array 2 to the light originating from the illuminating device 1 is essentially not cancelled, so that an image shown on the image display device 4, which, for example, is composed of several perspective views of a scene or object, is seen in three dimensions by the viewer from viewing direction B.

The diffusing layer 3b employed is favorably designed to be permanently (light—) diffusing. Preferably, it has a high light transmittance, which should at least be greater than 50%.

Figure 14:
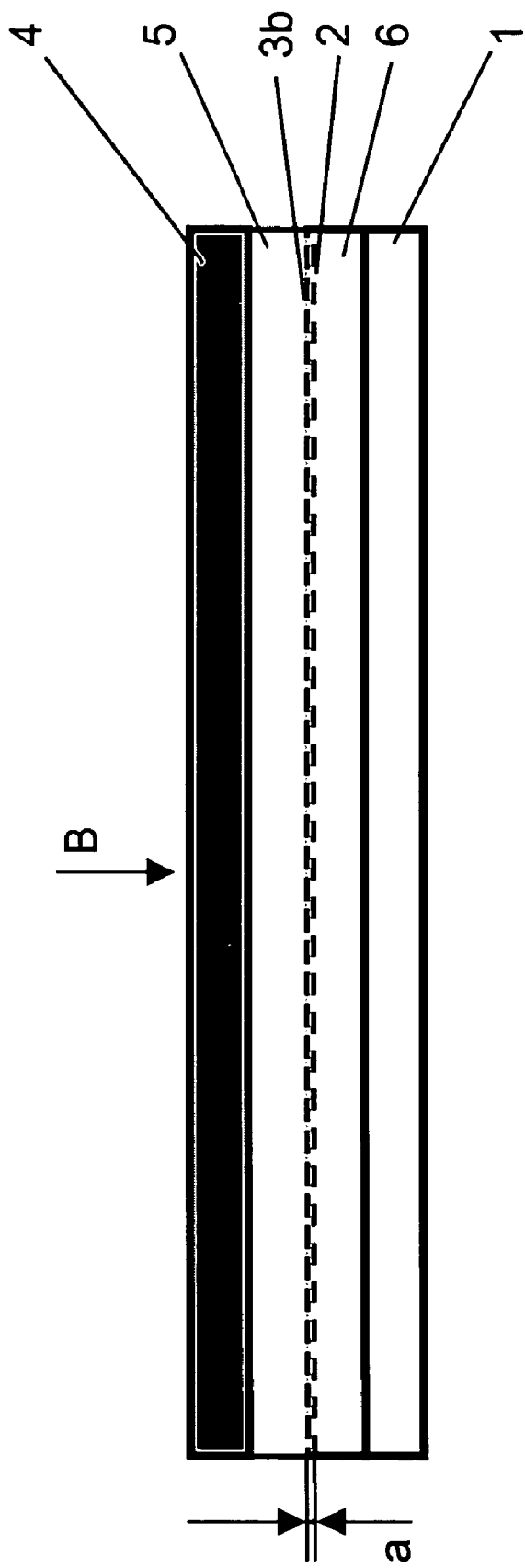
FIG. 14 is a sketch illustrating the principle of the embodiment version according to FIG. 10 in another possible second position.

In the embodiments of the arrangement according to the invention described with reference to FIGS. 12 through 14, based on the fourth embodiment according to FIG. 10 (corresponding to version 3b), the diffusing layer 3b is designed as an optically diffusing layer applied to a transparent substrate 5. In practical embodiments, the diffusing layer 3b may, for example, be a diffusing film commonly used for backlights of LCD panels, laminated onto a glass substrate. The laminated diffusing film preferably faces the filter array 2.

Figure 12:
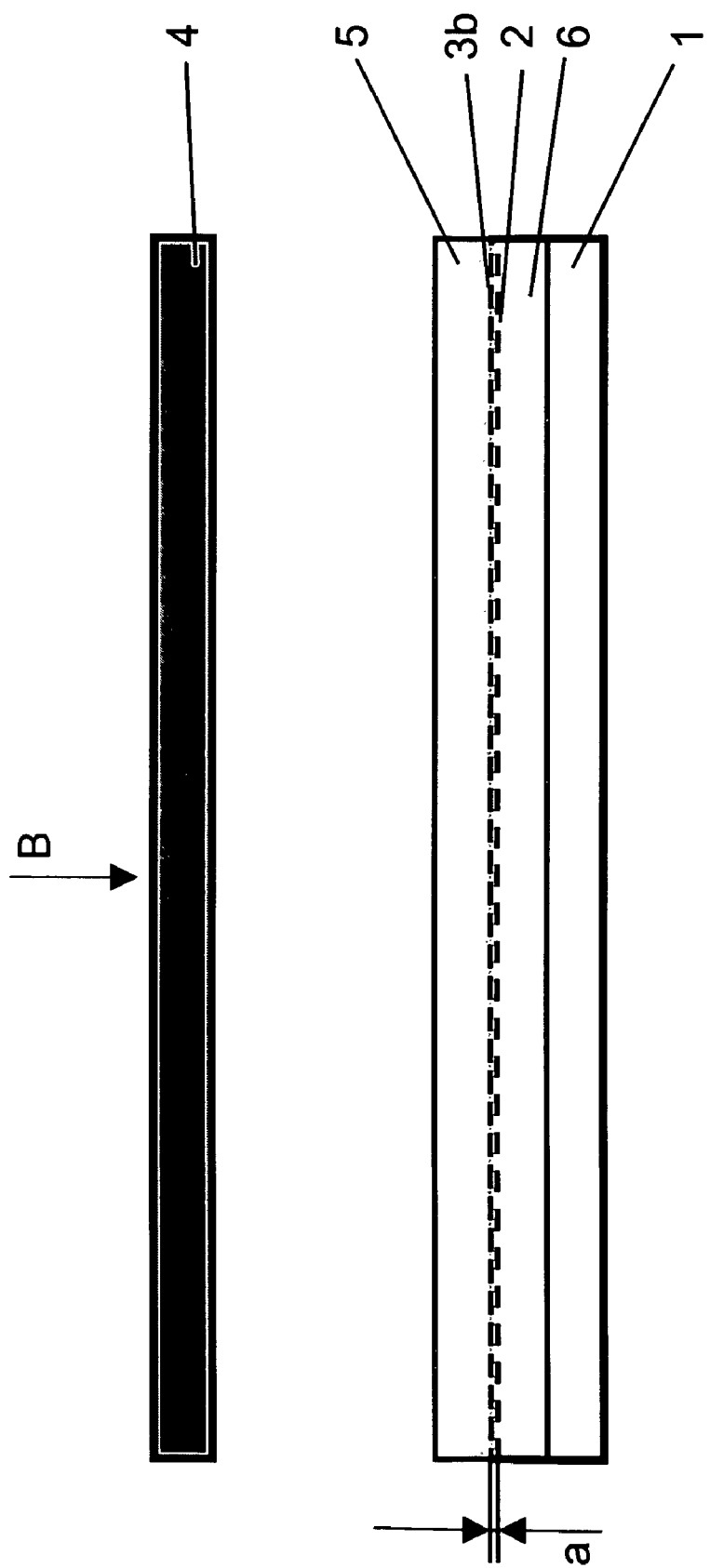
FIG. 12 is a sketch illustrating the principle of the embodiment version according to FIG. 10 in the second position.

In the principles illustrated by FIG. 10, FIG. 12 and FIG. 13, varying the distance a between the filter array 2 and the diffusing layer 3b is effected by moving the diffusing layer 3b and the transparent substrate 5, whereas the filter array 2 and the image display device 4 are immovable, i.e. spaced at an invariable distance from each other. The illuminating device 1 is, in this case, also immovable, i.e. spaced at fixed distances from the filter array 2 and the image display device 4.

It is also possible, however, to effect variation of the distance a between the filter array 2 and the diffusing layer 3b by moving the latter together with the image display device 4 and—if provided—the transparent substrate 5 relative to the filter array 2, whereas the filter array 2 is arranged in a fixed position. This case is shown in FIG. 13 and FIG. 14 and corresponds to version 3b. In this case, the illuminating device 1 is also immovable. Here, FIG. 13 should be interpreted in connection with FIG. 14 and the above description, rather than in connection with FIG. 12 as farther above.

In this version, the substrate 5 with the diffusing layer 3 doubles as a spacer that keeps the image display device 4 at a defined distance z from the filter array 2 in the 3D mode, i.e. in the second position of the arrangement. This distance z between the filter array 2 and the image display device 4 in the second position of the arrangement is, as a rule, between (including) 0.0 mm and (including) 20 mm; in versions 1a, 2a and 3a it may be z=0 mm.

Figure 15:
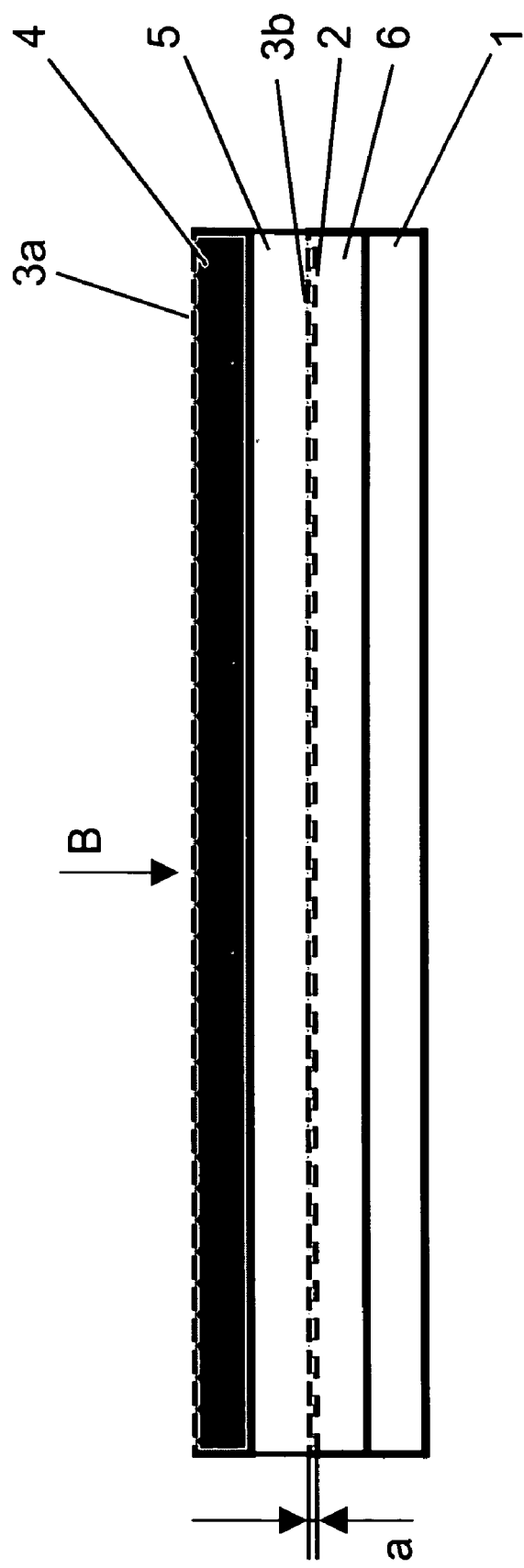
FIG. 15 is a sketch illustrating the principle of the embodiment version according to FIG. 11 in the second position.

FIG. 15 is another sketch illustrating the principle of the embodiment version according to FIG. 11, in which a separate diffusing layer 3b and a diffusing layer 3a are arranged in a second position. To reach that position, the image display device 4 including the diffusing layers 3a and 3b and their transparent substrate 5 have been moved. This corresponds to a combination of versions 3a and 3b.

Figure 16:
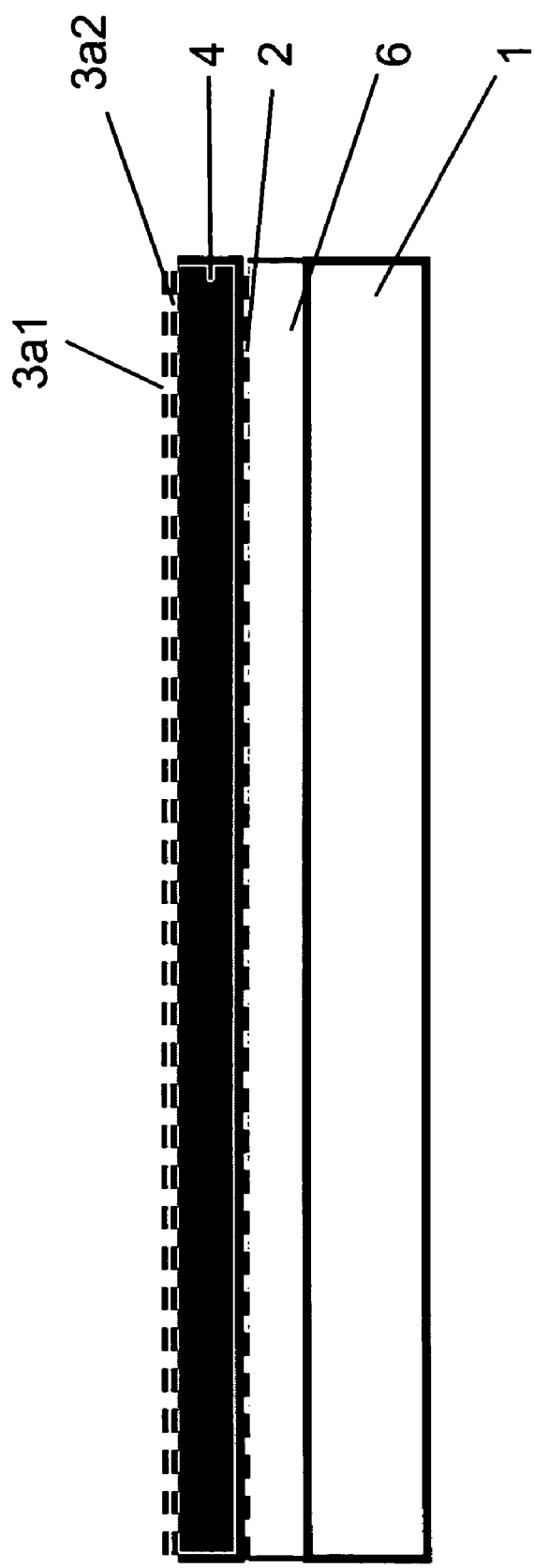
FIG. 16 is a sketch illustrating the principle of a sixth embodiment version in a second position.

FIG. 16 finally is a sketch illustrating the principle of a sixth embodiment version, in which a static diffusing layer 3a1 in the form of an antiglare matte finish and a switchable diffusing layer 3a2 are provided, with the embodiment being in a second position (3D mode), and an image display device 4 including the two diffusing layers 3a1, 3a2 having been moved. In this second position, the switchable diffusing layer 3a2 is switched to be transparent. In a first position (not shown) for 2D display (2D mode), the image display device 4 including the two diffusing layers 3a1, 3a would have a position at some distance (e.g., a=5 mm) from the illuminating device 1 and the filter array 2 on the transparent substrate 6, and the switchable diffusing layer 3a2 would be switched to be diffusing. This embodiment is an extension of version 3a.

In FIG. 16, the first diffusing layer 3a1 (in viewing direction) corresponds to the antiglare matte finish of an LCD panel. The second diffusing layer 3a2 is arranged between the front polarizer and the said antiglare matte finish of the LCD panel.

Figure 17:
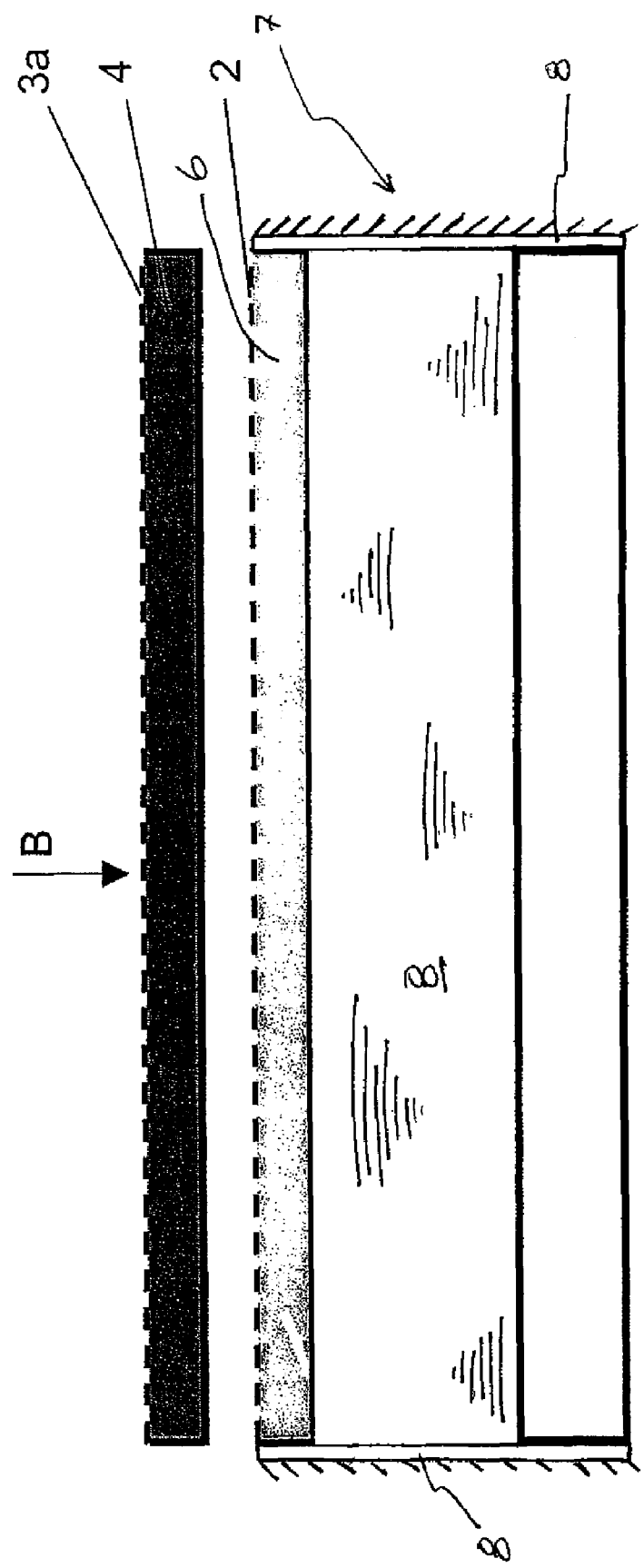
FIG. 17 is a sketch illustrating a cross-sectional view of the principle of the arrangement according to an embodiment of the present invention with mirror wells.

FIG. 17 is a sketch illustrating a mirror well 7 around the filter array 2 that provides a virtual homogenous enlargement of the filter array 2 or the luminous surface of the illuminating device 1, preferably in embodiment version 1a. Depending on the position of the arrangement according to the invention, the mirror well 7 reflects either the light of the illuminating device 1 or the part thereof that penetrates the filter array 2, so that the vignetting disappears.

The mirror well 7 is implemented, for example, by way of first-surface mirrors 8 of high reflectance (e.g., $\rho$>98%, 3M "Enhanced Speculator Reflector" film, laminated onto a plane carrier substrate), arranged normal (90°) to the surface of the filter array 2 and surrounding it. The slots required for mechanical components to effect the respective movement provided in the versions described above should be as small as possible. The mirror surface should be scratch-proof.

The following remarks apply to all embodiment versions mentioned above:

Depending on whether the respective embodiment features an antireflection or antiglare coating, the LCD panel used as image display device 4 may, for example, be the LCD panel of a commercial ViewSonic VX900 LC display with "anti-glare front polarizer" or a Sharp LQ64D142 with "anti-reflective front polarizer".

The illuminating device 1 may, for example, be a common sidelight consisting of a light guide with CCFL tubes or a backlight consisting of, for example, 16 CCFL tubes, plus a control system and various films (e.g., diffusers, Brightness Enhancement Films or Dual Brightness Enhancement Films).

The filter array 2 preferably is an exposed or plotted and processed photographic film containing transparent and opaque area segments. These area segments are arranged in a defined two-dimensional structure. Alternatively, the filter array may be applied onto the transparent substrate 6 in the form of printable ink. Further it is possible to fabricate the filter array by subsequent structuring, say, by means of laser beams.

With regard to the structuring and fabrication of filter arrays 2, reference is made again to DE 201 21 318 U1, WO 01/56265, PCT/EP2004/004464, PCT/EP2004/001833 and DE 101 45 133. Naturally, the filter array 2 may be designed and fabricated in other ways as well.

All substrates 5, 6 should have the best possible antireflection properties by multiple coating.

For the parallel movement of the respective components, essentially normal to their large surfaces, laterally fixed struts may be provided as mentioned above, by means of which the components are moved. The movement is executed, for example, by at least one stepper motor and/or at least one piezo-electric element and/or at least one solenoid (not shown on the drawings). The respective positioning drive is mechanically connected to the respective component to be moved.

Alternatively, movement of the filter array 2 or other/further components may be executed manually by the user, with easy manipulation being enabled by means of small wheels or of wings with eccentric cams, provided laterally on the arrangement according to the invention, the said wheels or wings being mechanically connected with the filter array 2 (and/or other components) and causing it to move. The driving force for moving the component is exerted by the user.

The advantages of the invention are many and varied. In particular, it uses simple means to create an arrangement suitable for permitting a choice between displaying images visible in three or two dimensions. In addition, the images have the same brightness, whether displayed in the 2D or 3D mode; in the preferred embodiment version, this brightness is not reduced by any additional components either. Moreover, especially in some of the embodiments (versions 1a, 2a, 3a and the fifth embodiment mentioned above), doing without the insertion of any optical components into the gap between the filter array and the image display device makes it possible to implement a normal 3D viewing distance also in the second position, even for high-resolution panels. Arrangements according to the invention have an ambient light compatibility equal to that of pure 2D displays.

What is claimed is:

1. An arrangement for display with selectable three-dimensionally visible or two-dimensional modes, comprising:
    an illuminating device emitting light distributed over an area;
    a filter array, arranged on the image viewing side of the illuminating device, that imparts a structure to the light originating from the illuminating device by use of an arrangement of transparent and opaque area segments;
    a transmissive image display device arranged on the image viewing side of the filter layer;
    a diffusing layer arranged on the image viewing side of the image display device, the diffusing layer and the image display device substantially rigidly connected to each other;
    wherein a distance $\alpha$ between the filter array and the diffusing layer is variable, such that
    in a first position, in which the diffusing layer is arranged at a distance from the filter array, the structure imparted by the filter array to the light originating from the illuminating device is essentially cancelled, and a two dimensional image is shown on the image display device in the full resolution provided by it; and
    in a second position, in which the diffusing layer is arranged in close proximity to the filter array, the structure imparted by the filter array to the light originating from the illuminating device is essentially not cancelled, such that the image display device shows an image that is seen in three dimensions.

2. An arrangement as claimed in claim 1, wherein the image display device, the diffusing layer and the illuminating device are substantially immovable;
    the filter array is supported by a transparent substrate; and
    the transparent substrate with the filter array is movable to vary the distance a relative to the diffusing layer.

3. An arrangement as claimed in claim 2, wherein the image display device comprises an LCD panel, and the diffusing layer comprises an antiglare matte finish of the LCD panel.

4. An arrangement as claimed in claim 3, wherein the substrate comprises a glass substrate and the diffusing layer comprises a diffusing film or a sheet of grease-proof paper, laminated onto the glass substrate, or as a ground or etched surface of the glass substrate.

5. An arrangement as claimed in claim 1, wherein the filter array is supported by a transparent substrate;
    the transparent substrate with the filter array is substantially rigidly connected to the illuminating device; and
    the transparent substrate, the filter array and the illuminating device are jointly movable to vary the distance relative to the diffusing layer and the image display device.

6. An arrangement as claimed in claim 1,
    the filter array is supported by a transparent substrate;
    the transparent substrate with the filter array is substantially rigidly connected to the illuminating device; and
    the diffusing layer and the image display device are jointly movable to vary the distance a relative to the filter array, the transparent substrate and the illuminating device.

7. An arrangement as claimed in claim 1, wherein the distance $\alpha$ in the first position is within a range of about 10 mm to about 30 mm, and the distance a is, in the second position, about 0.2 mm or greater.

8. An arrangement as claimed in claim 1, characterized in that the diffusing layer is designed to have a non-controllable defusing effect.

9. An arrangement as claimed in claim 8, wherein the image display device comprises and LCD panel, further comprising a second diffusing layer, with the first diffusing layer corresponding to an antiglare matte finish of the LCD panel, and the second, controllable diffusing layer being arranged between a front polarizer and the antiglare matte finish of the LCD panel.

10. An arrangement as claimed in claim 1, wherein the diffusing layer is controllable, so as to be diffusing in a first mode in the first position of the arrangement, and to act as a transparent medium in a second mode in the second position of the arrangement.

11. An arrangement as claimed in claim 1, wherein the diffusing layer is segmented into selectable area segments, and wherein the first and second positions can be set independently for the selectable area segments of the diffusing layer, so that parts of the area can be switched from three-dimensionally visible to two-dimensional display and vice versa.

12. An arrangement as claimed in claim 1, wherein the filter array is an exposed or plotted, and processed photographic film, containing transparent and opaque area segments, which are arranged in a defined two-dimensional structure.

13. An arrangement as claimed in claim 1, wherein a distance z between the filter array and the image display device in the second position of the arrangement is between about zero mm and about twenty mm.

14. An arrangement as claimed in claim 13, wherein the mirror well comprises first-surface mirrors of high reflectance, arranged substantially normal to the filter array and surrounding the filter array.

15. An arrangement as claimed in claim 1, further comprising a stepper motor, a piezo-electric element, a solenoid or a pump for executing a movement that changes the distance $\alpha$.

16. An arrangement as claimed in claim 1, wherein a movement, that changes the distance $\alpha$, is executed manually.

* * * * *